United States Patent [19]
Valy et al.

[11] Patent Number: 5,088,622
[45] Date of Patent: Feb. 18, 1992

[54] UNDER PRESSURE GAS TANK WITH CONTROL OF DELIVERED GAS FLOW

[75] Inventors: Yves H. G. Valy, St. Medard en Jalles; Pascal D. Coquet, Bordeaux; Michel Amagat, St. Aubin du Medoc, all of France

[73] Assignee: Societe Anonyme dite: Aerospatiale Societe Nationale Industrielle, Paris, France

[21] Appl. No.: 585,410

[22] Filed: Sep. 20, 1990

[30] Foreign Application Priority Data

Sep. 29, 1989 [FR] France .................. 89 12733
Nov. 22, 1989 [FR] France .................. 89 15343

[51] Int. Cl.$^5$ .............................................. B67D 5/00
[52] U.S. Cl. .......................................... 222/3; 222/213; 222/386.5; 222/387
[58] Field of Search ............ 222/3, 212, 213, 386.5, 222/387; 137/564.5

[56] References Cited

U.S. PATENT DOCUMENTS

| | | | |
|---|---|---|---|
| 3,208,646 | 9/1965 | Wessenger | 222/386.5 |
| 3,731,843 | 5/1973 | Anderson, Jr. | 222/3 |
| 3,883,046 | 5/1975 | Thompson et al. | 222/386.5 |
| 4,031,917 | 6/1977 | DeJohn et al. | 137/613 |
| 4,478,358 | 10/1984 | Lantry | 222/213 |
| 4,867,593 | 9/1989 | Kurokawa et al. | 222/213 |

FOREIGN PATENT DOCUMENTS

| | | | |
|---|---|---|---|
| 676460 | 6/1987 | Belgium | 222/213 |
| 112711 | 8/1900 | Fed. Rep. of Germany | |
| 1207128 | 2/1960 | France | |

OTHER PUBLICATIONS

Patent Abstracts of Japan, vol. 10, No. 353 (M-539) [2409], Nov. 28, 1986.

*Primary Examiner*—Michael S. Huppert
*Assistant Examiner*—Philippe Derakshani
*Attorney, Agent, or Firm*—Marshall, O'Toole, Gerstein, Murray & Bicknell

[57] ABSTRACT

Pressurized gas tank comprises a casing provided with an opening communicating with an orifice and connecting the inside of the tank with the outside. Gas flow through the orifice is controlled by a flow control valve. The casing is elastically deformable in response to the gas pressure contained in said tank (1). Deformation of the tank is transmitted to the flow control valve to control the flow of gas therethrough.

26 Claims, 12 Drawing Sheets

UNDER PRESSURE GAS TANK WITH CONTROL OF DELIVERED GAS FLOW

FIELD OF THE INVENTION

The present invention concerns an under pressure gas tank provided with means for controlling the delivered gas flow, the gas pressure inside said tank possibly reaching several hundreds of bars.

BACKGROUND OF THE INVENTION

Although not exclusively, the present invention is in particular adapted to be implemented in known composite tanks, so that it shall be described hereafter more particularly with respect to this type of tank constituted by an internal jacket and an external shell with filament windings coated with synthetic resin. It is known that in these composite tanks, the internal jacket ensures gas-tightness, whereas the purpose of the filament winding shell is to provide mechanical resistance. In addition, this is generally effected to ensure that the deformation of the internal jacket under the effect of the internal pressure is of the plastic type, whereas the deformation of the external shell is elastic. Thus, it is possible to obtain for the tank a linear elastic deformation according to the pressure.

Owing to their excellent mechanical resistance and light weight, these composite tanks are widely used in space technology for storing gas under high pressure (up to 800 bars). For example, they contain oxygen, hydrogen or nitrogen so as to ensure the servitudes of a manned space missile, or still better they store gases making it possible to pressurize the propulsion ergols of launched rockets or satellites.

Of course, so as to be able to use the gas stored in such a tank, it is necessary to control the gas flow at the outlet of said tank. To this effect, a series of controlled pressure reducing valves is provided, the opening of these valves being controlled according to the evolution of the pressure in the tank. Having regard to the high pressures inside the tank and reliability and safety requirements relating to these high pressures, such pressure reducing valves and their controls are heavy (about 25 Kg), which prove to be highly unsuitable for spatial applications.

SUMMARY OF THE INVENTION

The object of the present invention is to overcome this drawback and provide an under pressure gas tank with control of the delivered gas flow and making it possible to avoid using the aforesaid pressure reducing valves and thus considerably reduce the total weight of the tank and its operational accessory equipment.

To this effect, according to the invention, the under pressure gas tank comprising a casing communicating with an orifice able to connect the inside of said tank with the outside under the control of a stopping device, is notable:

in that said casing is embodied so as to be elastically deformable according to the gas pressure contained in said tank; and in that it comprises means for controlling the gas flow passing through said orifice, means which are actuated by an actuating member linked to said casing by the deformation of said casing under the effect of said under pressure gas.

Thus, by means of the present invention, it is the variation of volume of the casing under the effect of the internal pressure of the gas it contains which makes it possible to control the gas flow through said orifice. It is therefore no longer necessary to provide heavy and costly external control devices.

It shall be noted that, generally speaking, particularly as regards their fixing, it is not advantageous that gas tanks are deformable, since it is then essential to take account of their volume variation. By virtue of the present invention, this volume variation becomes an advantage as regards control of the gas flow.

Preferably, said tank comprises a rigid element disposed inside said casing and supported by one of its ends against said tank, said control means being controlled by the other of said ends of said rigid element.

This rigid element may be fixed to said tank by one of its ends, the other of said ends passing through said opening.

It is advantageous that the tank casing according to the present invention has a revolution shape and said rigid element is disposed along the axis of said casing. When, in particular, said casing is spherical so as to be able to resist high pressures, said rigid element is disposed along a diameter of said casing.

Advantageously, the tank of the present invention comprises a sliding bearing disposed in said opening so as to guide the corresponding end of said rigid element, said sliding bearing making it possible to provide free gas communication between said orifice and said casing.

It shall be noted that it is particularly advantageous that the tank casing of the present invention has the internal jacket—external filament shell composite structure, it then being possible:

by an appropriate disposition of the filament windings of the external shell to favor the elastic deformation of the casing parallel to said rigid rod; and/or by prestressing via the elastic shell the internal jacket rendered plastically deformable to obtain parallel to said rigid element an expansion and retraction of the casing directly proportional to the gas pressure contained in the tank.

In a particularly simple embodiment, said means for controlling the gas flow comprises a valve able to cooperate with a seat fitted in a wall separating said opening from said orifice and pierced by a passage traversed with play by said rigid element.

Thus, as it shall be seen in more detail later, when filling said gas tank, said valve plays a safety role preventing the tank being filled above the filling pressure nominal value. It shall be noted that, generally speaking, the known current safety devices provided to prevent a gas tank exploding when being filled are constituted by an exhaust valve and not a stop valve, as in this case with the present invention.

The tank of the invention, filled with gas to said filling nominal value and associated with its stopping device, can remain stable in this state. On the other hand, as soon as the stopping device is opened, the tank can deliver the gas it contains outside.

Such a valve can control the opening and closing of said tank only. However, this valve and its seat shall preferably have a wide-mouthed section so as to delimit a valve passage section for the gas flow able to vary according to the internal pressure of said tank.

Said means for controlling the gas flow may, in variants or in combination, comprise a core with a variable section able to cooperate with a passage provided in a wall separating said opening from said orifice so as to provide the gas flow with a passage section able to vary according to the internal pressure of said tank.

Said means for controlling the gas flow may also comprise a mobile flap. Thus, for example, a cam integral with said rigid element is provided to control said mobile flap.

In one advantageous embodiment, said orifice communicates with said opening through two passages with different diameters and connected in parallel, the larger of said passages being able to be closed by said mobile flap.

Said stopping device may be constituted by a stop valve outside said tank. However, said tank preferably comprises means for blocking said rigid element in translation when, with said tank being full, the gas flow between said orifice and said opening is interrupted by said control means. Thus, such blocking means form a stopping device inside the tank and which can be used alone or in combination with an external stop valve. Such blocking means may be of the valve needle or similar type and possibly they may be provided so as to be remote controlled.

According to a first embodiment variant of the present invention concerning the linking of said actuating member to the casing, the under pressure gas tank is notable in that it comprises a deformable structure disposed inside said casing and connected at several points to the latter, said deformable structure controlling the position of said actuating member.

Preferably, elastic means are provided tending to press said deformable structure against the internal wall of said casing.

According to another variant of the present invention concerning also the linking of said actuating member to said casing, the under pressure gas tank is notable in that it comprises a rigid element outside said tank and connected on one side to the wall of said tank and on the other side to said actuating member.

Advantageously, said actuating member forms a sliding support axis for said casing.

According to one aspect of the present invention concerning the linking between the actuating member and the control means, the under pressure gas tank is notable in that a hydraulic movement transmission system is disposed between said actuating member and said control means.

Said hydraulic system is preferably constituted by a set of two jacks with different diameters and disposed in series so that the two pistons of said hydraulic system delimit between them an intermediate chamber filled with a hydraulic fluid and said actuating member is linked to the piston with the larger diameter, whereas said control means are connected to the piston with the smaller diameter.

In addition, it is an advantage to provide elastic means tending to press said pistons in the direction of said actuating member.

According to an embodiment variant concerning said control means, the under pressure gas tank is notable in that said gas flow control means comprise a guillotine system moved by aid actuating member transversally to the relative displacement of the latter with respect to said casing.

One end of said actuating member preferably has the shape of a ramp against which said guillotine system is pressed by elastic means.

According to another embodiment variant concerning said control means, the under pressure gas tank is notable in that said gas flow control means comprise a rotary flap which is actuated by said actuating member and whose axis of rotation is parallel to the direction of the relative displacement of said actuating member with respect to said casing.

Advantageously, the rotation of said rotary flap is controlled by said actuating member by means of a helical ramp system.

According to another embodiment variant concerning said control means, the under pressure gas tank is notable in that said means for controlling the gas flow comprise a rotary flap which is actuated by said actuating member by means of a rack system and whose axis of rotation is orthogonal to the direction of the relative displacement of said actuating member with respect to said casing.

BRIEF DESCRIPTION OF THE DRAWINGS

The figures of the accompanying drawing shall readily explain how these various variants may be embodied. On these figures, identical references denote similar elements.

DETAILED DESCRIPTION OF THE PREFERRED EMBODIMENTS

Figure 1:
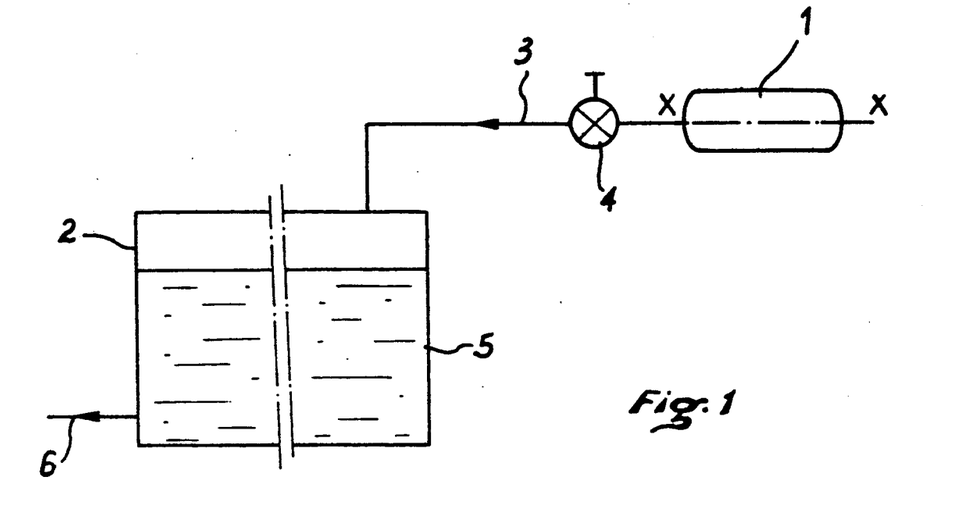
FIG. 1 shows diagrammatically a possible application of the tank according to the present invention.

FIG. 1 shows an under pressure gas tank 1 according to the invention and intended to feed a chamber 2 with gas by means of a link 3 on which a stop valve 4 is mounted. The chamber 2, which has a high volume, contains a liquid 5 intended to be expelled outside the chamber 2 through an outlet 6 under the pressure of the gas previously stored in said tank 1. For reasons of spatial requirement and weight, the volume of the tank 1 needs to be small so that the initial pressure of the gas in the latter is high to provide the liquid 5 with pressurization exceeding a specific threshold (for example 10 bars) even when there is only a small quantity of liquid 5 in the chamber 2.

FIG. 1 shows a tank 1 with the shape of a cylindrical bottle with an axis X—X and whose ends are domes, for example, hemispherical domes.

As it can be seen on FIG. 1, no device outside the tank 1 is provided to control the gas flow in the link 3 when the stop valve 4 is open. In fact, said bottle 1 comprises in its inner part a rigid rod device of the type to be described hereafter, said rigid rod being disposed along said axis X—X.

Figure 2:
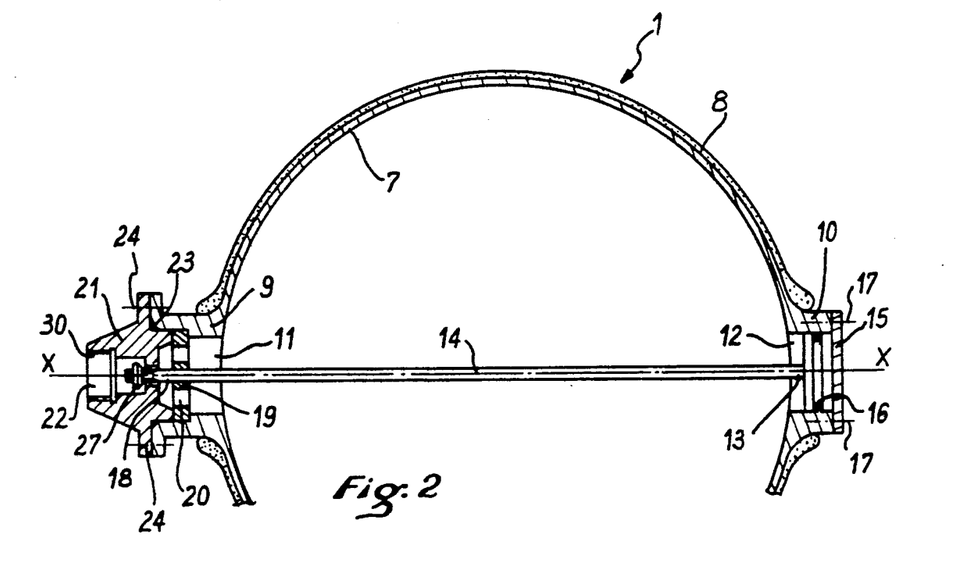
FIG. 2 is a partial axial section view of a first embodiment of the tank according to the present invention.

In the embodiment of FIG. 2, the tank 1 has a spherical shape. Its casing comprises a spherical internal jacket 7 made of a metal, such as aluminium or titanium, supporting a shell 8 constituted by filament windings composed of resistant fibers (glass, carbon, Kevlar (registered trade mark), etc . . . ) coated with polymerized resin.

The internal metal jacket 7 is provided with two diametrically opposing joining pieces respectively delimiting openings 11 and 12.

The tank 1 has preferably undergone a preparatory pressurizing operation (one of the joining pieces 9 and 10 being sealed off, whereas the other is used for introducing an under pressure fluid) so that the elastic deformation limit of the internal metal jacket is exceeded without this being the case for the shell 8 whose elastic deformation limit is much higher. Thus, deformation by expansion of the internal metal jacket passes into the plastic area and during the return to atmospheric pressure of the tank, said internal metal jacket is in a prestressed state by the elastic action of the shell 8. In addition, it follows that if the tank afterwards undergoes pressurization higher than that of said preparatory operation, the deformation of the tank becomes proportional to the pressure applied.

The joining piece 10 is used for securing one end 13 of a rigid rod 14 to said tank. The rigid rod 14 is disposed inside the tank 1 along the diameter X—X of the latter linking the centers of said joining pieces 9 and 10. The end 13 of the rod 14 is integral with a stopper 15 able to seal said joining piece 10 by means of a joint 16, fixing means 17 (only indicated by the line of their axis) making it possible to render said stopper (and thus the rod 14) integral with the tank 1.

The end 18 of the rod 14 opposite the end 13 passes through the opening 11 by being guided by a sliding bearing 19 disposed in the latter and pierced with openings 20 allowing for gas exchanges on both sides of said bearing 19.

Figure 3:
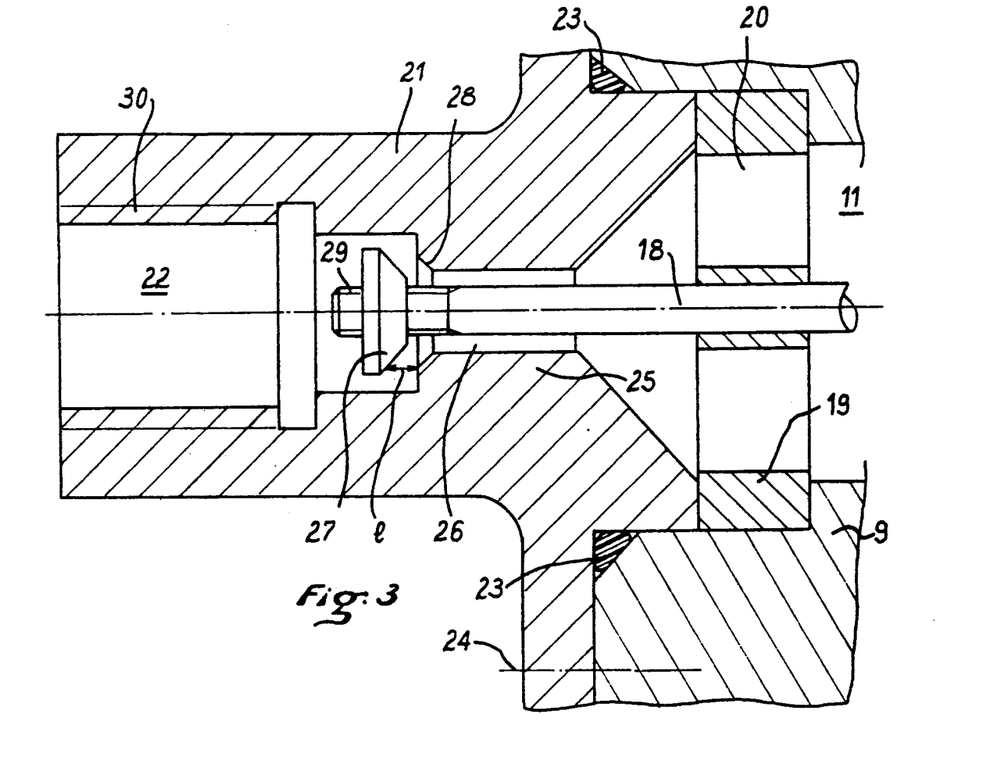
FIG. 3 shows on a larger scale the valve of the tank of FIG. 2.

As this is also shown on larger scale on FIG. 3, a connector 21 delimiting an orifice 22 is seal-fixed onto the joining piece 9 by means of a joint 23 and to fixing means 24 (only shown by the line of their axis). The connector 21 comprises a transversal wall 25 pierced by a passage 26 traversed with play by the end 18 of the rod 14.

On the side of the orifice 22, the end 18 of the rod 14 is integral with a valve head 27, whereas the corresponding face of the wall 25 comprises a seat 28 for said valve head 27. So as to adjust the position of the valve head 27 with respect to the seat 28, said valve head 27 may be a nut able to be screwed on a threading 29 of said end 18 of the rod 14.

At rest, the valve head 27 and the seat 28 are in the relative position shown on FIGS. 2 and 3 and in which said valve head comes away from its seat 28 so that the passage 26 ensures gas communication between the orifice 22 and the opening 11 (that is, between the orifice 22 and the inside of the tank 1) through the bearing 19.

Thus, if the orifice 22 is connected to an under pressure gas source (not shown) by means of a threading 30 provided for this purpose, it is possible fill the tank 1 with said gas.

As the pressure increases gradually inside the tank 1, the latter expands so that the seat 28 draws nearer to the valve head 27, the end 18 of the rod 14 sliding into the bearing 19. When the internal pressure of the tank 1 reaches a value so that the seat is abutting against the valve head 27, the tank 1 is closed and it becomes impossible to introduce additional gas. Therefore, it can be observed that the pressure inside the tank of the present invention may not exceed a nominal filling value, depending both on the expansion capacity of the tank 1 and the initial position of the valve head 27 with respect to the seat 28.

Thus, it is possible to fix the nominal filling value by virtue of the actual construction of the tank 1, an adjustment being able to be made by means of the adjustable valve head.

After filling of said tank 1 to its nominal filling value and separation of said filling gas source, said tank is connected to the stop valve 4 (see FIG. 1) by means of its threading 30. As long as the stop valve 4 is shut, the tank 1 remains closed. In fact, although the closing device constituted by the valve head 27 and the seat 28 is not fully sealed owing to the high pressure existing inside the tank 1, the small gas leaks which occur accumulate between the stop valve 4 and the tank 1 so that the valve 27 is in pressure equilibrium. On the other hand, as soon as the stop valve 4 is opened, the valve 27 is on one side subjected to the low pressure existing inside the chamber 2 and, on the other side, to the high internal pressure existing in the tank 1. Furthermore, the actual elasticity of the expanded tank 1 tends to compress the latter. It shall be noted that in the case where the tank 1 has undergone the preparatory operation mentioned above rendering the internal metal jacket plastic, this elasticity is solely ensured by the shell 8 which elastically compresses the internal jacket 7 which plastically retracts.

In these conditions, as soon as the stop valve 4 is opened, the valve head 27 comes off its seat 28 and the gas passes from the tank 1 to the chamber 2 through the opening 11, the openings 20 of the bearing 19, the passage 26, the gap between the valve head 27 and the seat 28, the orifice 22, the opened stop valve 4 and the link 3. The pressure thus lowers in the tank 1 and the latter retracts. Whilst retracting, the tank 1 provokes a relative sliding of the end 18 of the rod 14 with respect to the bearing 19 so that the valve head 27 draws slightly further away from the seat 28.

Thus, gradually during the gas transfer between the tank 1 and the chamber 2, the valve head 27 progressively moves away from its seat 28 widening the section of the passage of the gases between said valve head 27 and the seat 28. The evolution of this gas passage section of the closing device 27, 28 obviously depends on the relative profiles of the valve head 27 and the seat 28, as well as the retraction of the tank 1 under the effect of the internal pressure drop and the elasticity of said tank.

Figure 4:
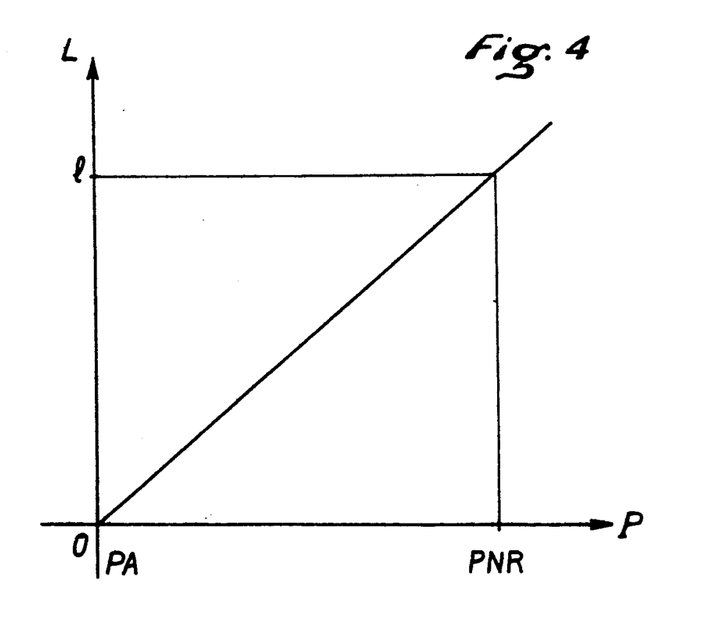
FIG. 4 is a diagram illustrating the operation of said tank.

Before filling up the tank 1 and using the content to feed the chamber 2, it is possible to carry out experimental tests so as to determine the linear expansion L of said tank 1 along the axis X—X according to the pressure P. A linear variation, such as the one shown on FIG. 4, is then obtained. It is thus possible to determine the value 1 of this linear expansion between the atmospheric pressure PA and a required nominal filling pressure PNR and to adjust the initial gap between the valve head 27 and its seat 28 to this value 1 as shown on FIG. 3.

Furthermore, with the aid of the diagram on FIG. 4, it is possible to know as regards each value of the pressure P included between PA and PNR the relative position of the valve head 27 with respect to its seat 28. It then becomes possible to give the valve head 27 and its seat 28 a profile evolution so that at each pressure value P included between PA and PNR a determined value of the passage section for the gas corresponds delimited between said valve and said seat.

Furthermore, as on discharging the tank 1 the fall of pressure inside the latter according to the time depends, apart from said passage section, on the pressure and volume conditions existing in the tank 1 and in the chamber 2, it can be seen that it is possible in these circumstances to adjust the profile of the valve head 27 and its seat 28 so as to obtain in the link 3 a required variation of the discharge flow of the gas according to the time.

On FIGS. 2 and 3, it is assumed that the cooperating surfaces of the valve head 27 and its seat were conical. Thus, in this case, as along as the two cooperating surfaces are opposite each other, the passage section is formed by a ring-shaped surface whose width increases with the spacing of the valve with respect to the seat. In addition, it is clear that, for a relative position of the valve with respect to its seat, the passage section depends on the angle of the top of the cooperating conical surfaces of the valve head 27 and the seat 28.

Figure 5:
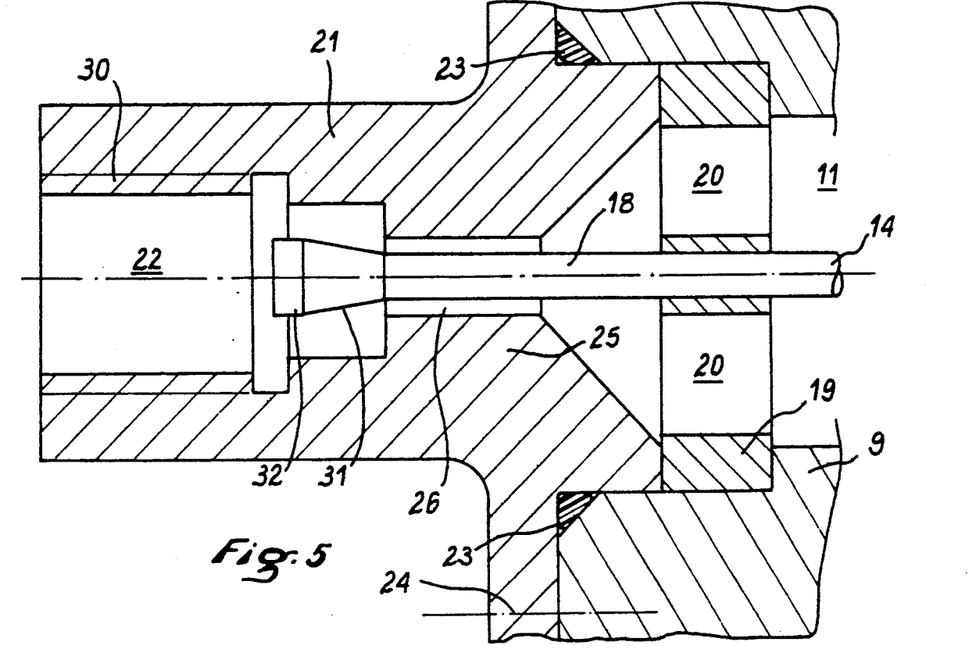
FIGS. 5 and 6 show on a larger scale embodiment variants of the control means of the tank of FIG. 2.

In the embodiment variant shown on FIG. 5, this variant contains the various elements 18 to 26 and 30 of FIG. 3, except for the valve head 27, the seat 28 and the threading 29. In the device represented, the end 18 of the rod 14 bears a core having a conical section 31 bulging as far as an end cylindrical section 32 whose external diameter enables it to slide by gentle rubbing in the passage 26. At rest, (position shown on FIG. 5), the end cylindrical section 32 and the bulged conical section 31 of said core protrude outside the passage 26 in the direction of the orifice 22, so that a gas filling passage section is provided between the end 18 of the rod 14 and the passage 26. When the tank 1 is being filled with gas, this passage section gradually reduces, the conical bulged section 31 of the core penetrating into the passage 26. At the end of filling, the end cylindrical section 32 of the core penetrates into the passage 26 so as to form a stopper there. It can be seen that the reverse process takes place when the gas is discharged outside the tank 1, the passage section gradually increasing as the conical bulged section 31 leaves the passage 26.

In the device of FIG. 5, a high degree of gradualness of the variation of the passage section may be obtained due to the fact that the conical bulged section 31 may be long so as to cooperate for a considerable length of time with the wall of the passage 26 during the relative translation of the rod 14 with respect to the wall 25. However, in the filling position, the stopper 32 closes the passage less effectively than the valve 27.

Figure 6:
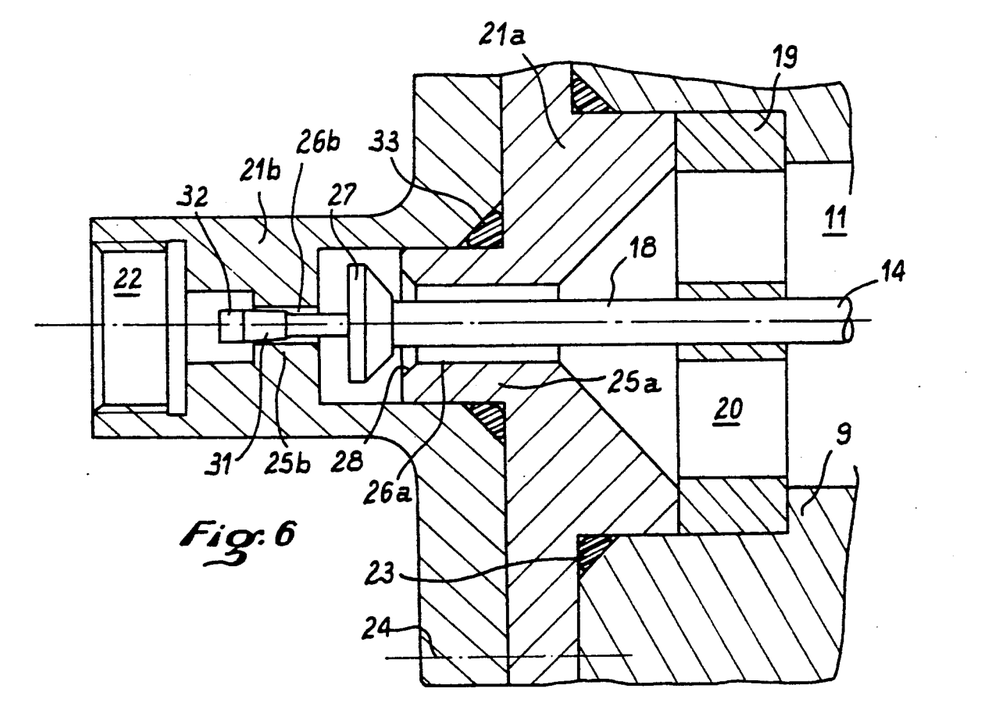

Thus, in the embodiment variant shown on FIG. 6, both the closing device 27, 28 of FIG. 3 and the closing device 31, 32 of FIG. 5 have been provided so as to obtain suitable gradualness of the variation of the passage section for the gas during discharge and effective closing when the tank is full.

In the device of FIG. 6, the connector 21 comprises two sections 21a and 21b able to be seal-assembled by means of a joint 33. The end 18 of the rod 14 is shaped to have at the same time a valve head 27 and the core sections 31 and 32. The valve head 27 may cooperate with the seat fitted at the end of the passage 26a provided in the wall 25a of the connector section 21a. The core sections 31 and 32 are provided to cooperate with the passage 26b provided in the wall 25b of the connector section 21b. The relative disposition of the passages 26a, 26b of the valve head 27, of the seat 28 and the core sections 31 and 32 is provided so that the valve head 27 abuts against the seat 28 when the section 32 is in the passage 26b.

Figure 7:
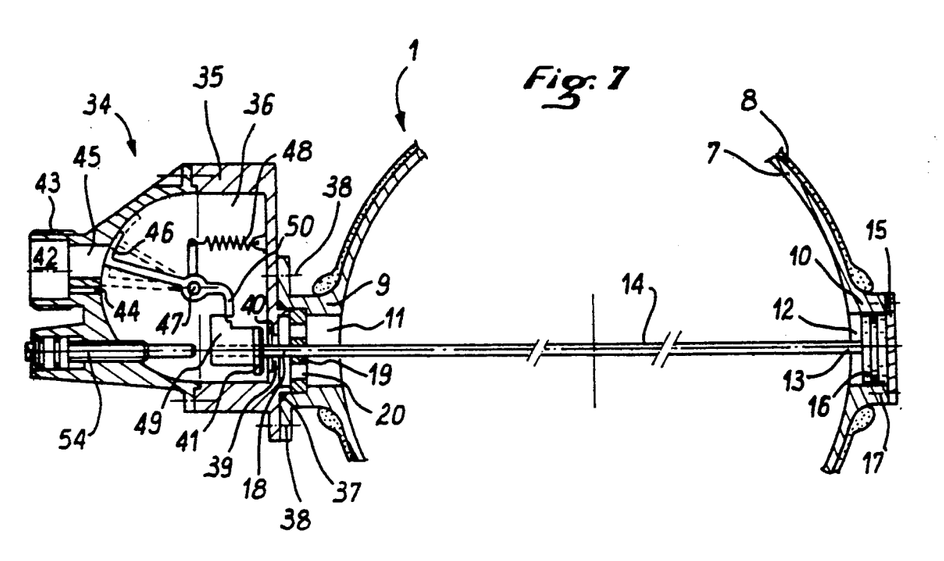
FIG. 7 is a partial axial section view of a second embodiment of the tank according to the invention.

In the embodiment variant of the tank according to the present invention and as shown on FIG. 7, this figure shows the various elements 7 to 20 opposite FIG. 3. However, in this case, the connector 21 is replaced by a mobile flap device 34. This mobile flap device 34 comprises a sealed casing 35 delimiting an internal chamber 36. It is seal-fixed to the joining piece 9 via its casing 35 by means of a joint 37 and to fixing means 38 (only shown by their axis).

The end 18 of the rod 14 penetrates inside the casing 35 into the chamber 36 by means of a passage 39 provided in the wall of said casing 35. The edge of the passage 39 directed towards the chamber 36 is used as a seat 40 for a valve 41 integral with the end 18 and disposed inside said chamber 36.

In addition, the device 34 comprises an orifice 42 able to connect it to the outside, for example by means of a threading 43. This orifice 42 is connected to the chamber 36 by two passages 44 and 45, the passage 45 being large with respect to the passage 44.

Inside the chamber 36, a mobile flap 46 is mounted, for example, tilting around an axis 47 and intended to control the passage of gas through the passage 45. A spring 48 acts on the mobile flap in the direction whereby the latter frees the passage 45, whereas a cam 49 integral with the end 18 of the rod 14 and cooperating with profile follower 50 integral with the flap is able to control the closing of said passage 45 by the stopper 46.

Figure 8:
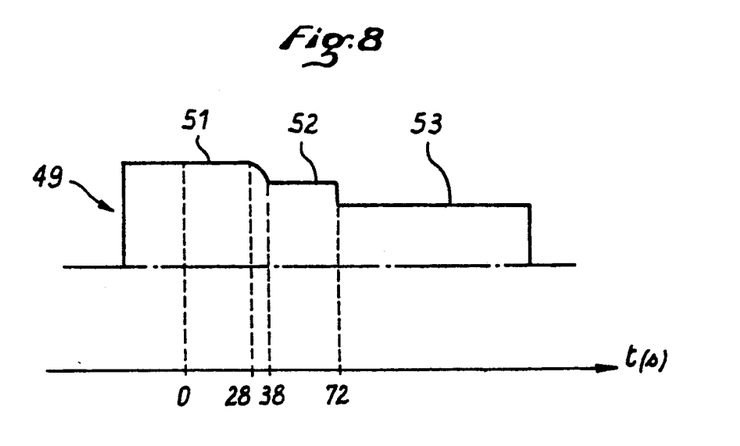
FIG. 8 is a diagram showing on a larger scale the profile of the cam used in the embodiment of FIG. 7 with an indication of the position of the profile follower according to the time t.

As shown on larger scale on FIG. 8, the cam 49 exhibits for example a step-profile 51, 52, 53.

In addition, a valve needle 54 traverses the casing 35 in a sealed way and is able to cooperate with the end 18 of the rod 14.

At rest, the end 18 of the rod 14 penetrates far enough into the chamber 36 so that firstly the valve 41 is moved away from the seat 40, and secondly the profile follower 50 cooperates with the lowest step 53 of the cam 49 so that under the action of the spring 48 the flap 46 completely frees the passage 45. If the orifice 42 (by means of the threading 43) is the connected to an under pressure gas source (not shown), this gas penetrates into the tank 1 through the orifice 42, the passages 44 and 45, the chamber 36, the passage 39, the openings 20 and the opening 11. Consequently, the tank 1 expands so that the end 18 of the rod 14 draws nearer to the seat 40 and the profile follower 50 slides onto the step 53 in the direction of the intermediate step 52. The gas filling operation continues and this applies also to expansion of the tank 1 so that the profile follower 50 is forced to leave the step 53 so as to come at rest on the intermediate step 52. It thus follows that the flap 46 is moved against the action of the spring 48 and partly closes the passage 45. The gas filling of the tank 1 continues through the reduced passage 45 and the passage 44 and the profile follower 50 slides onto the intermediate step until it has reached the highest step 51.

At this moment, the flap closes completely the passage 45 but not the passage 44 and the filling of the tank continues through said passage 44 until the valve 41 comes to rest against the seat 40. The tank 1 is therefore filled to its nominal value pressure.

The valve needle 54 can then be actuated to block up the valve against the seat 40 so that no gas leakage occurs outside the tank 1.

After separation of the filling gas source, the tank 1 can be connected to the chamber 2 through the stop valve 4 by means of the threading 43. After the valve needle 54 is actuated so as to unblock the rod 14 and opening of the stop valve 4 (which may be possibly suppressed), the chamber 2 can be fed from the tank 1.

Figure 9A:
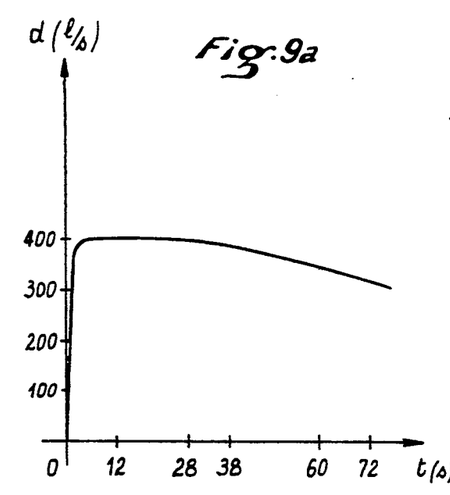
FIGS. 9a, 9b, 9c and 9d are diagrams showing the operation of the tank of FIG. 7.

FIGS. 9a, 9b, 9c and 9d show an example of the feeding of the chamber 2 by assuming that the nominal value of the filling pressure PNR of the tank 1 was 326 bars and that, according to the time t (in seconds), it is desired to obtain a variation of the flow rate d (in litres per second) in the link 3, such as the one shown on FIG. 9a. As mentioned in FIG. 3, the passage sections of the gas at the outlet of the tank 1 have accordingly been calculated.

At the instant t=0, corresponding to the opening of the stop valve 4, the pressure inside the tank 1 is equal to 326 bars, the passage 45 is closed by the flap 46, since the profile follower 50 is pushed back by the step 51 (see also FIG. 8) and the valve 41 abuts against the seat 40. In the manner indicated above opposite FIG. 3, the discharge starts through the stopper 40, 41, in this case by means of the passage 44 having a passage section s of 9.45 mm2 (see FIG. 9d). As a result, there is a drop of pressure in the tank 1 (see FIG. 9b) and spacing of the valve head from its seat (see FIG. 9c). At the end of 28 secs, the pressure inside the tank has dropped from 326 bars to 195 bars and the spacing e of the valve head 41 of the seat 40 has moved from 0 to 1.2 mm.

In addition, from the moment t=28s and until the moment t=38s, the profile follower 50 moves from the upper step 51 to the intermediate step 52 so that the passage section s moves from 9.45 mm2 to 20.4 mm2, the flap 46 partly freeing the passage 45. Between the instants t=28s and t=38s, the pressure P inside the tank 1 drops from 195 bars to 152 bars, whereas the spacing e moves from 1.2 mm to 1.6 mm.

Between the instants t=28s and t=72s, the passage section s remains equal to 20.4 mm2, since the profile follower is still at rest on the intermediate step 52 and the internal pressure of the tank 1 continues to drop until it has reached 47 bars, whereas the spacing e moves from 1.6 mm to 3 mm.

At the instant t=72s, the profile follower moves from the intermediate step 52 to the lower step 53 freeing completely the passage section 45. The passage section suddenly increases to 96.7 mm2.

From the foregoing, it can be seen that once the linear expansion of the tank along the axis X—X (for example by means of experimental tests having supplied a curve similar to that shown in FIG. 4) is known, the linear retraction of said tank, which is the opposite of said expansion, is also known since the deformation is elastic.

Figure 9B:
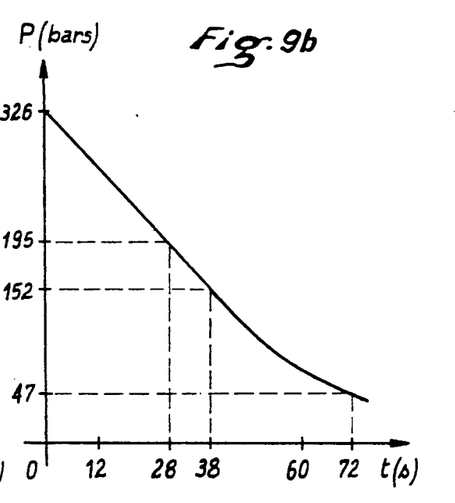
Figure 9C:
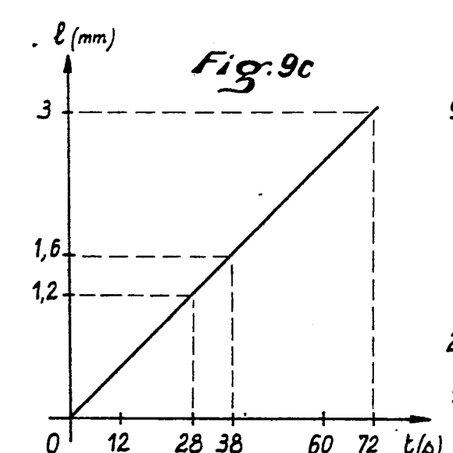
Figure 9D:
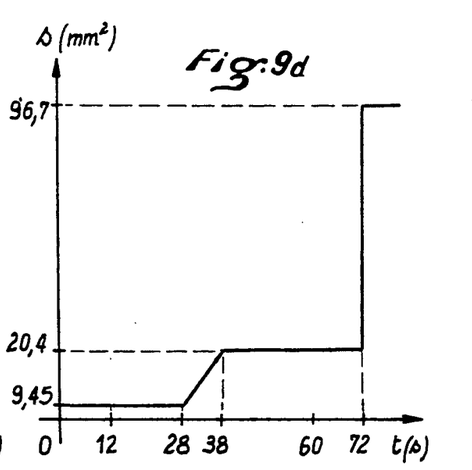

It is therefore possible to adjust the cam 49 so as to obtain appropriate passage sections which, having regard to the pressure drop shown on FIG. 9b, permit the variation of the flow rate shown by FIG. 9a.

Figure 10:
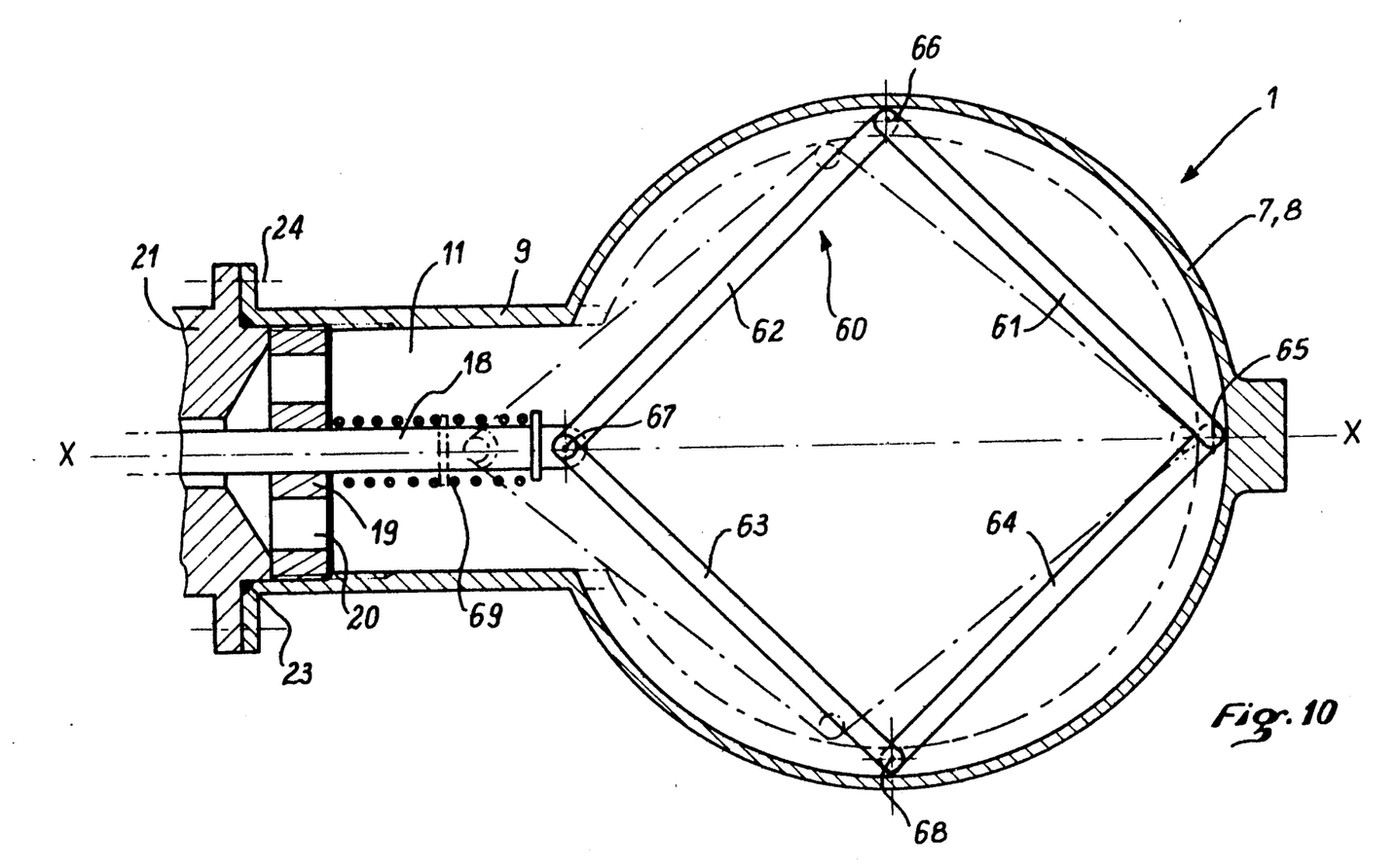
FIGS. 10 and 11 show diagrammatically in axial section tanks according to the invention and provided with embodiment variants for the means connecting the actuating member to the casing of said tank.

The embodiment of the tank 1 shown on FIG. 10, although shown in a simplified way, may have a casing 7, 8 as described above. This casing 7, 8 is shown as having a spherical shape and having a joining piece 9 delimiting an opening 11 centered on a diameter X—X of said casing. Similarly to what is shown on FIGS. 2 to 6, a connector 21 is seal-fixed onto the joining piece 9 by means of a joint 23 and to fixing means 24 (only shown by the line of their axis). It shall be noted that, instead of the connector 21, the connector 34 shown on FIG. 7, or indeed any one of the connectors described hereafter, could be connected onto the joining piece 9. This connector 21 delimits an orifice 22 (not shown here, but visible on FIGS. 2 to 6) communicating with the inside of the casing 7, 8 by means of the opening 11 and the connector 21.

In the opening 11, a sliding bearing 19 is provided pierced with openings 20 so as to allow for gas exchanges on both sides of said bearing 19. The bearing 19 guides by sliding a rod-shaped member 18 able to slide along the diameter X—X.

On the side of the connector 21, the member 18 is integral with the means 27, 31, 32 or 46 for controlling the gas flow, not shown on FIG. 10 but visible on FIGS. 2 to 7.

On the side of the tank 1, instead of being connected to the casing 7, 8 by a rod 14 as shown above, the control member 18 of the means for controlling the gas flow is joined to a pantograph 60. This pantograph 60 is disposed inside the tank and its four arms 61 to 64 are, for example, of equal lengths. The hinge 65 between the arms 61 and 64 is preferably situated on the diameter X—X and is possibly fixed to the internal wall of the tank 1. The hinge 67 between the arms 62 and 63 is preferably situated also on the diameter X—X and is integral with the end opposite the control member 18. The hinges 66 and 68, respectively between the arms 61, 62 and 63, 64, are in support against the internal wall of the tank 1. This support is ensured by a spring 69 tending to press the control member 18 towards the inside of the tank 1.

The shape of the pantograph 60 depends on the volume of the tank 1 so that the position of the control member 18 along the axis X—X depends also on said volume. FIG. 10 shows, in the full lines and in the dot-and-dash lines, the position of the tank 1, the pantograph 60 and the control member 18 respectively when the said tank is inflated and deflated.

Thus, the pantograph plays in the tank 1 of FIG. 10 a similar role to that of the rod 14 so that the operation of this tank 1 is the same as that of the embodiments described above.

Figure 11:
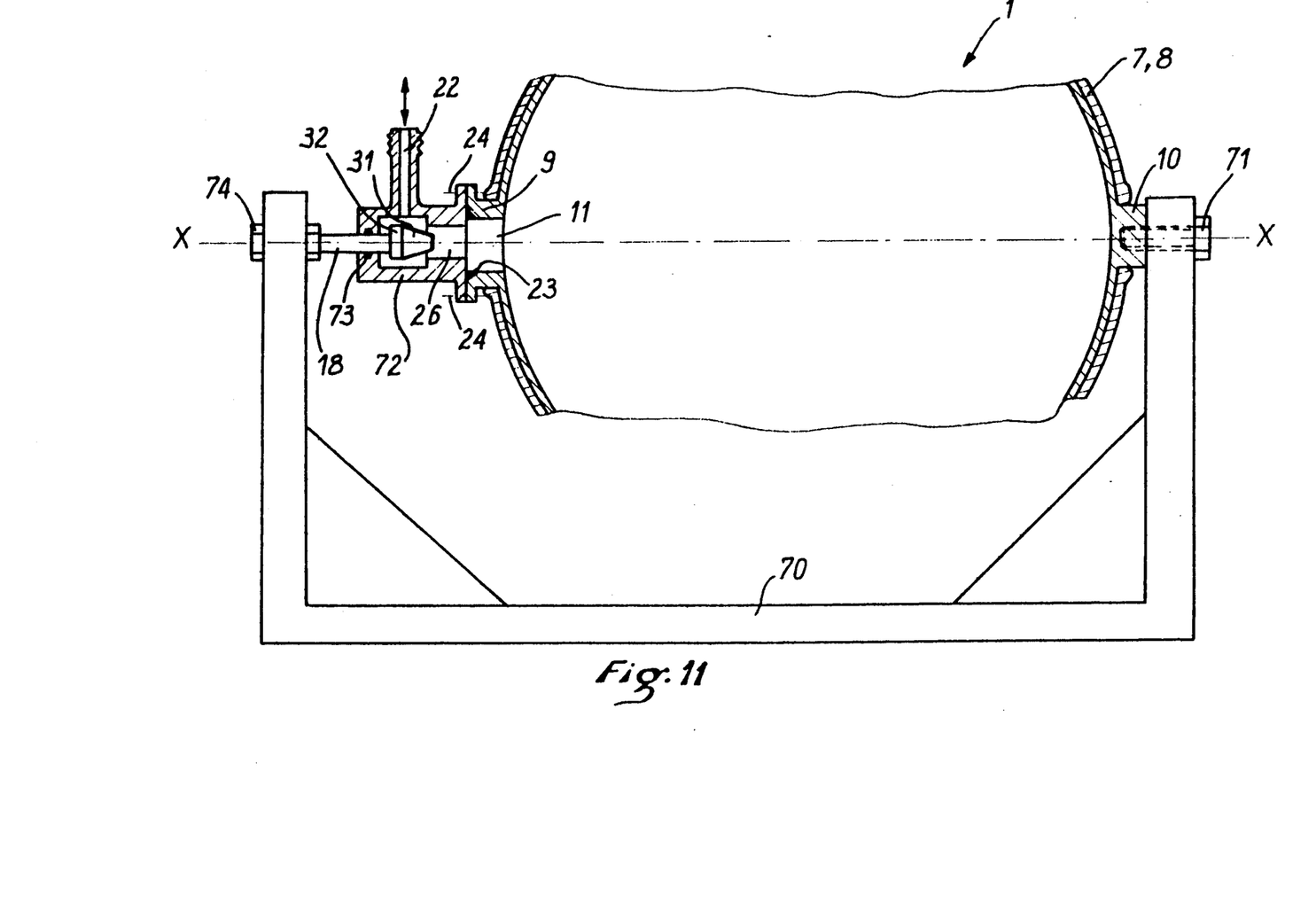

In the embodiment variant shown on FIG. 11, the joining piece 10 of the tank 1, diametrically opposing the joining piece 9, is fixed to a rigid frame 70 by means of fixing means 71. In addition, on said joining piece 9, a connector 72 is fixed via a joint 23 and fixing means 24, said connector comprising an orifice 22 disposed laterally and communicating with the inside of the tank 1 by means of the opening 11 and a passage 26. Inside the passage 26, a core 31, 32 is disposed as shown on FIGS. 5 and 6. Identically to what was described above, the core 31, 32 is intended to control the gas flow passing through the passage 26.

This core 31, 32 is integral with the control member 18 which by means of a joint 73 seal-traverses said connector 72 on the side of the latter opposite the tank 1. In addition, the control member 18 is rendered integral with the rigid frame 70, for example by means of fixing means 74.

Thus, when the tank 1 expands or retracts, said control member is used as a sliding bearing for the end of said tank opposite the fixing means 71 so that the core 31, 32 closes or opens the passage 26 more or less to the gas flow, as explained above.

The outer frame 70 thus plays the role of the rigid rod 14.

Figure 12:
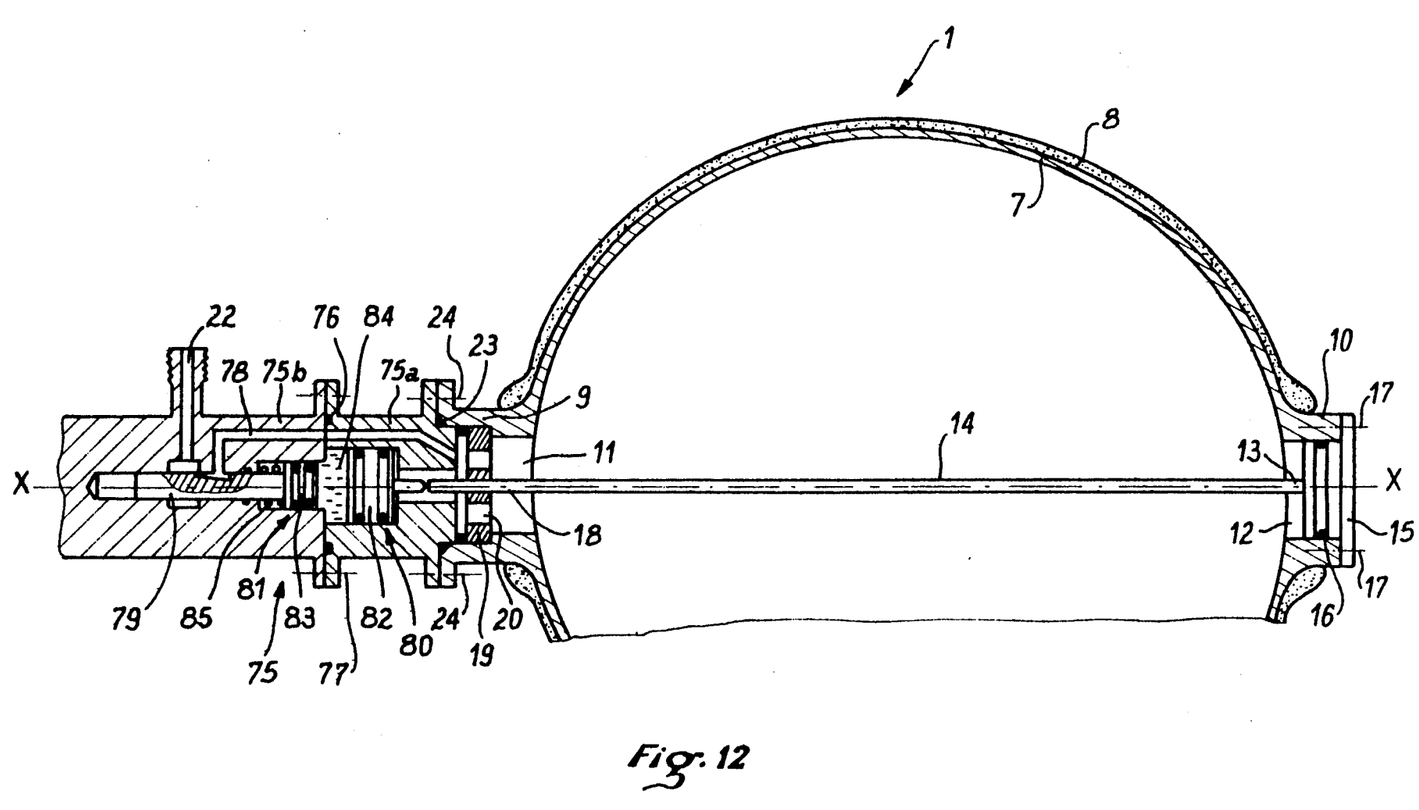
FIGS. 12 to 14 diagrammatically illustrate in section variants of means for linking between said actuating member and said means for controlling the gas flow.

In the embodiment of the tank 1 shown on FIG. 12, this figure shows the various elements 7 to 20 and 22 to 24 described opposite FIG. 2. However, in this case, the connector 21 is replaced by a connector 75 consisting of two parts 75a and 75b, seal-connected together by a joint 76 and fixing means 77 (simply shown by their axes). The connector 75 delimits the orifice 22 disposed laterally, this orifice able to be placed in communication with the inside of the tank 1 by means of at least one pipe 78 traversing said connector 75. Gas communication between the orifice 22 and the pipe 78 is controlled by a slide valve 79.

Inside the connector 75, a motion transfer hydraulic system comprising two jacks 80 and 81 of different diameters is disposed. The jacks 80 and 81 are disposed in series so that their respective pistons 82 and 83 delimit between them an intermediate chamber 84 full with a hydraulic fluid.

The control member 18 (that is, in this case the end of the rod 14 disposed on the side of the connector 75) is in support against the piston 82 with the larger diameter, whereas the slide valve 79 is integral with the piston 83 with the smaller diameter. In addition, a spring 85 tends to press the pistons 82, 83 in the direction of said control member 18.

Owing to the different diameters of the jacks 80 and 81, it can be seen that the motion transfer hydraulic system is used as a displacement amplifier for discharging the tank 1. Thus, a small relative displacement between the control member 18 and the tank 1 is transformed into a much larger relative displacement between the slide valve 79 and said tank. As a result, the adjustment of the gas flow through the orifice 22 is rendered more sensitive to the pressure variation inside the tank 1.

Figure 13:
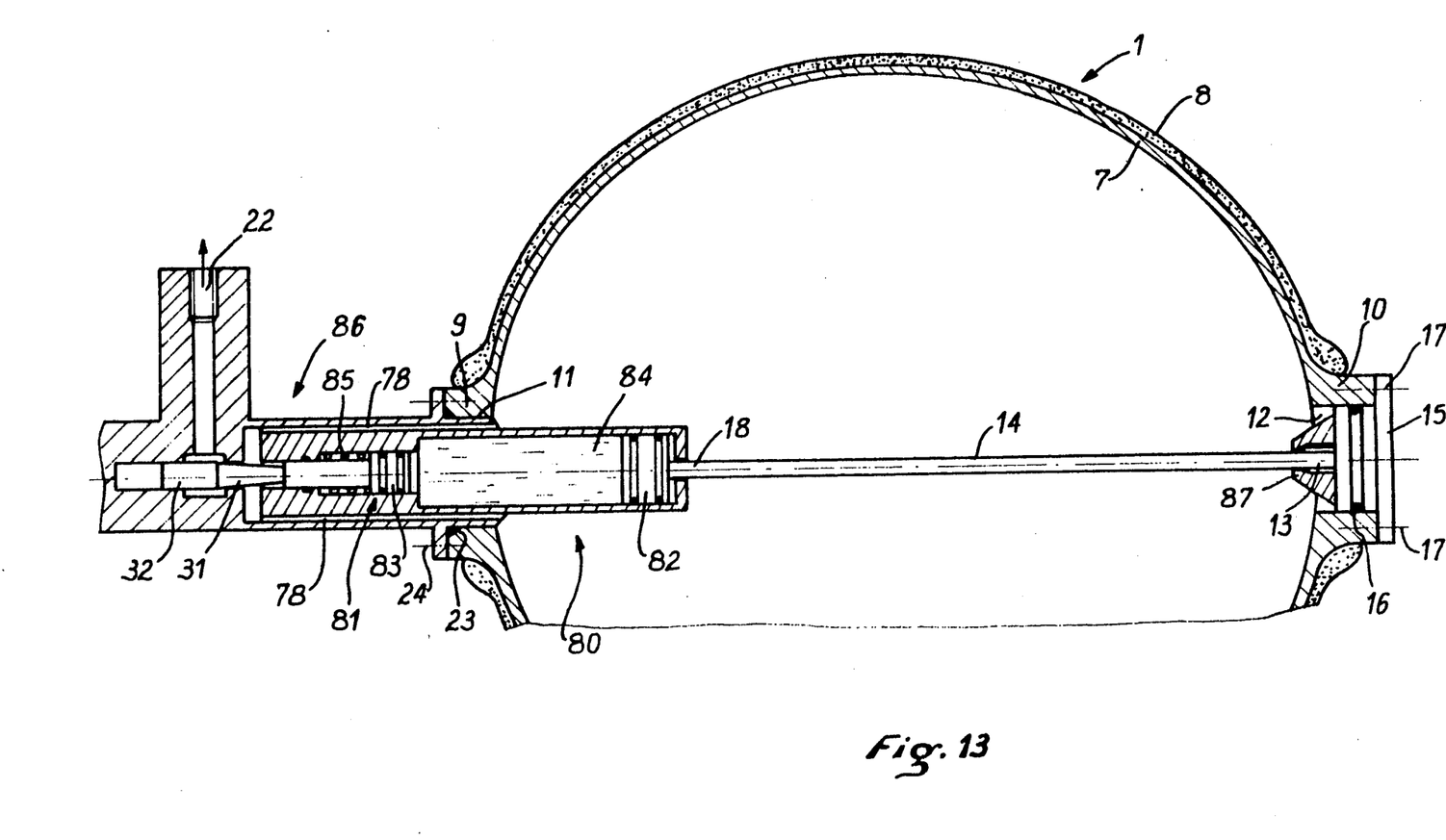

In the embodiment variant of the FIG. 13, a connector 86 slightly different to the connector 75 of FIG. 12 has been provided. In this case, the connector 86 partly penetrates the inside of the tank 1 thus closing the opening 11, which makes it possible to suppress the bearing 19, the control member 18 being integral with the larger piston 82. The end 13 of the rod 14 may therefore be in simple support against the stopper 15 whilst being guided by a bearing 87 integral with the latter. The pipe or pipes 78 open(s) directly into the tank 1 (and no longer into the opening 11) and the slide valve 79 has been replaced by a core 31, 32.

Figure 14:
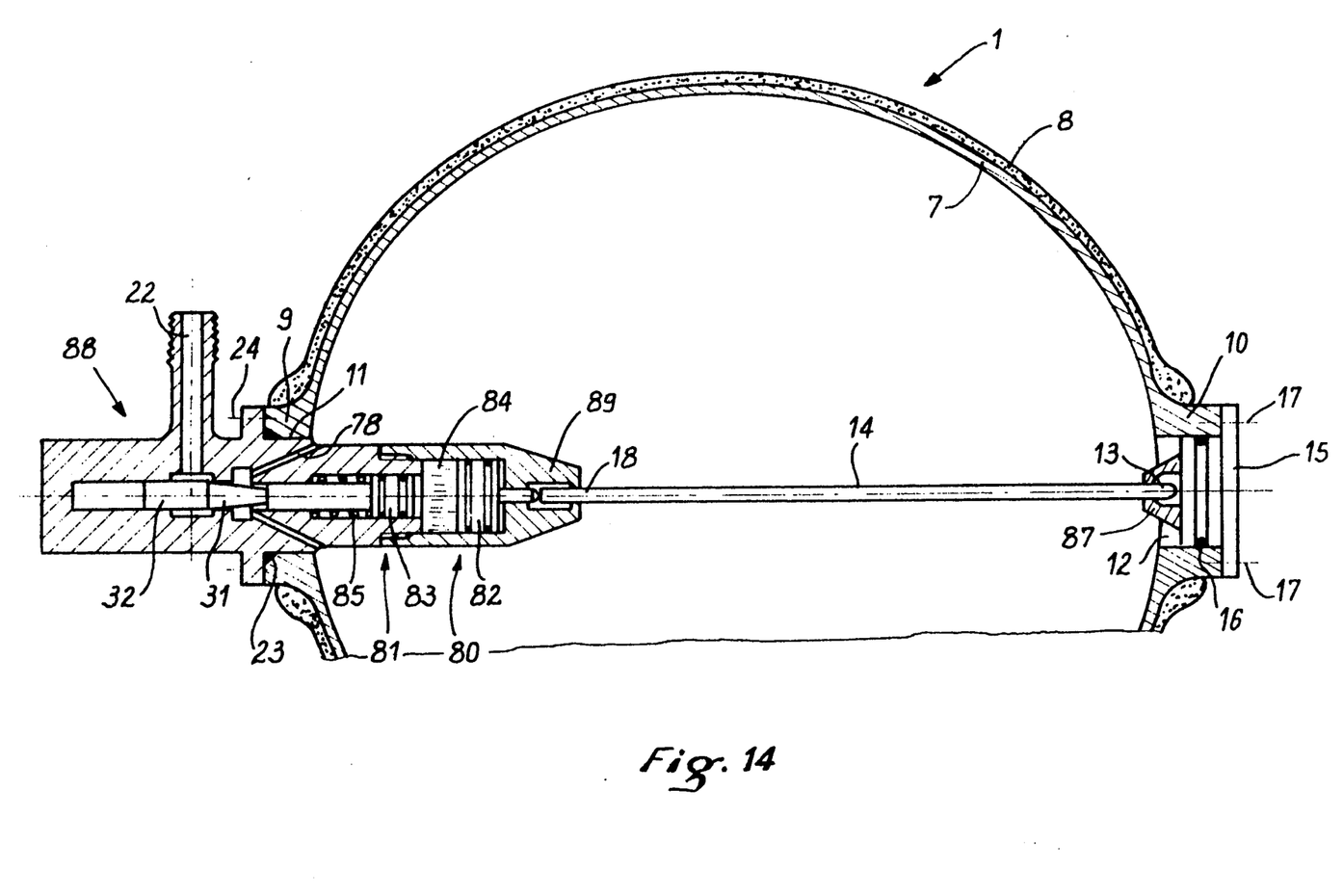

The embodiment variant of FIG. 14 is almost similar to that of FIG. 13. However, in this case, the control member 18 is in support against the larger piston 82 and the corresponding connector 88 comprises a sliding bearing 89 for said control member.

Figure 15:
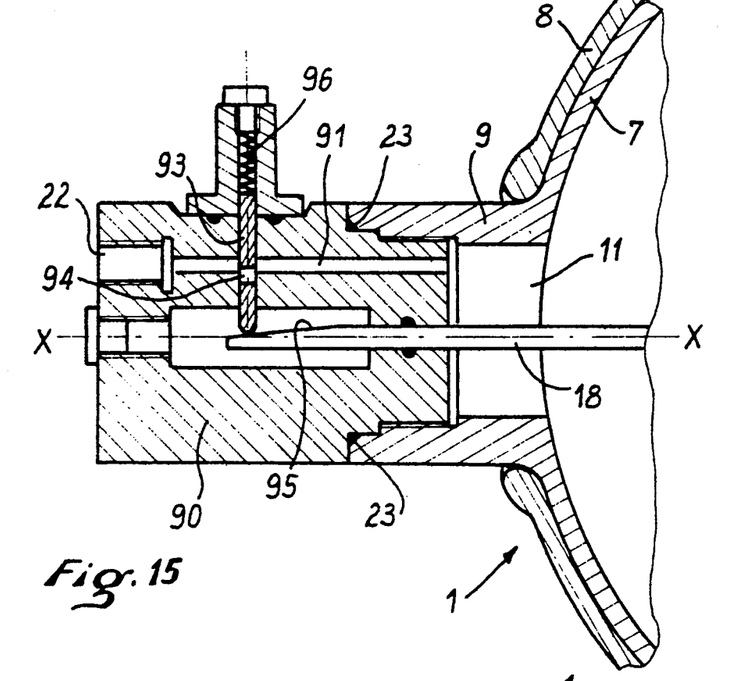
FIGS. 15 to 17 show diagrammatically in section embodiment variants of said means for controlling the gas flow.

The connector 90, shown on FIG. 15, is mounted on the joining piece 9 by screwing with a joint 23 being inserted. It delimits the orifice 22 in gas communication with the tank 1 via a pipe 91. The control of the gas flow in the pipe 91 is effected by a guillotine 93 pierced with an orifice 94 and moving transversal to the diameter X—X. The control member 18, sliding guided by said connector 90, is provided at its free end with a ramp 95 against which said guillotine 93 is elastically pressed by a spring 96. It can thus be seen that depending on the pressure in the tank 1, the guillotine 93 is moved more or less by the ramp 95 of the control member 18 sliding along the diameter X—X so that its orifice 94 coincides more or less with the pipe 91, which delimits in the latter a passage section able to vary according to said pressure, this passage section able to be nil if the orifice 94 is sufficiently excentered so that the guillotine 93 closes the pipe 91.

Figure 16:
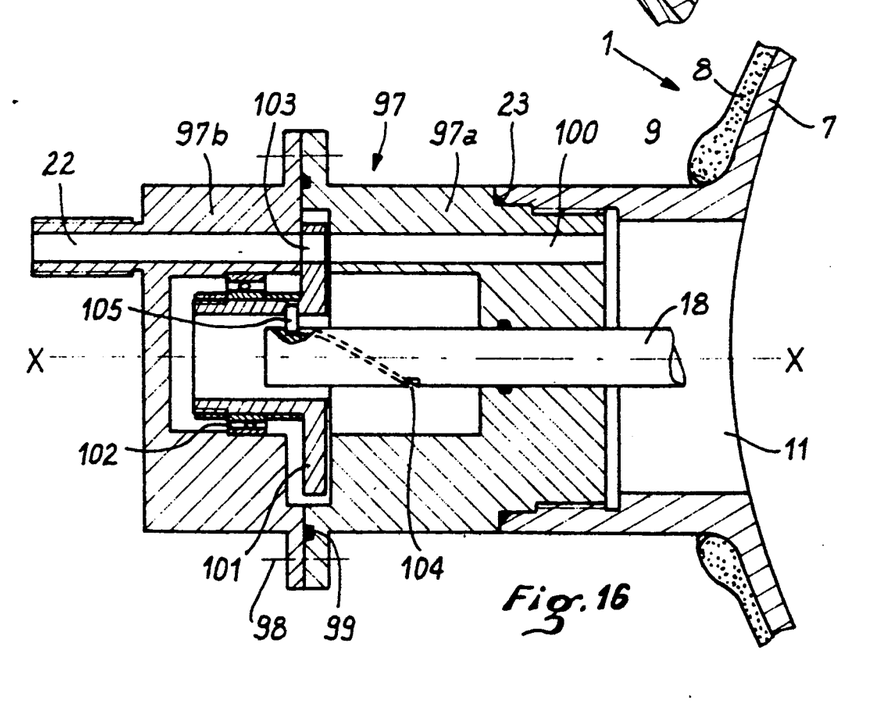

The connector 97, shown on FIG. 16, is embodied in two sections 97a and 97b assembled together in a sealed way by means of fixing means 98 (simply shown by their axes) and to a joint 99. It is mounted onto the joining piece 9 by screwing with insertion of a joint 23. It delimits the orifice 22 in gas communication with the tank 1 by a pipe 100. A flap 101 able to rotate around the axis X—X, for example by means of a ball bearing 102, is mounted inside the connector 97. The flap 101 comprises an orifice 103 able to be brought to coincide more or less with the pipe 100, depending on the position of the flap 101 around its axis of rotation. The control member 18 comprises an helical groove 104 engaging a slug 105 linked to the rotary flap 101. Thus, the member 18 undergoes a relative displacement along the diameter X—X under the effect of the pressure existing inside the tank 1 and rotates said flap 101 so that the orifice 103 may more or less coincide with the pipe 100. Thus, a variable passage inside the pipe 100 may be controlled, the latter able to be closed by the flap 101 when the rotation is sufficient to completely move out of center the orifice 103 with respect to the pipe 100.

Figure 17:
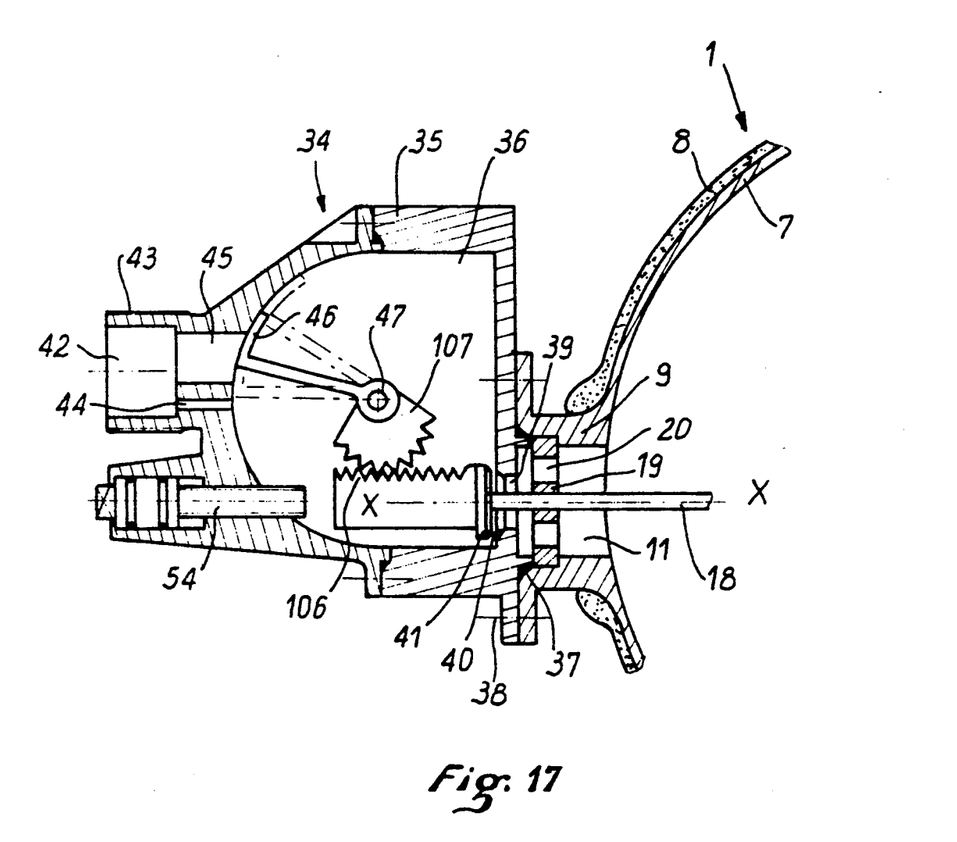

FIG. 17 shows a connector 34 basically similar to the connector with the same reference described opposite FIG. 7. This figure shows the elements 9, 11, 18 to 20, 35 to 47 and 54. In this embodiment variant, the control in rotation of the flap 46 around its axis 47 (orthogonal to the diameter X—X) is obtained by means of a rack 106 integral with the control member 18 cooperating with a toothed sector 107 integral with the flap 46 and no longer by means of the cam 49 and the profile follower 50.

What is claimed is:

1. A tank for storage of gas under pressure comprising:
    an elastically deformable casing having an opening;
    flow control means communicating with said opening for controlling the flow of gas between the interior of said casing and an orifice communicating with the outside of said casing;
    actuating means for controlling said flow control means, said actuating means including an actuating member linked between said casing and said flow control means;
    whereby movement of said actuating member resulting from expansion or contraction of said casing under increasing or decreasing gas pressure is communicated to said flow control means to control in a predetermined manner the flow of gas through said orifice.

2. Tank according to claim 1, wherein said actuating member comprises a rigid element disposed inside said casing with one of its ends bearing against said casing, said flow control means being controlled by the other of said ends of said rigid element.

3. Tank according to claim 2 wherein said rigid element is connected at one of its ends to said tank and wherein the other of said ends passes through said opening.

4. Tank according to claim 2 wherein said casing has a revolution shape and wherein said rigid element is disposed along the axis of said casing.

5. Tank according to claim 4 wherein said casing is spherical and wherein said rigid element is diametrical.

6. Tank according to claim 3 comprising a sliding bearing disposed in said opening so as to guide the corresponding end of said rigid element, said sliding bearing allowing for gas flow between said orifice and said casing.

7. Tank according to claim 1 wherein said casing comprises an internal jacket and an external filament shell.

8. Tank according to claim 7 wherein said internal jacket is plastically deformable and is prestressed by said external filament shell.

9. Tank according to claim 2 wherein said flow control means comprises a valve able to cooperate with a seat fitted in a wall separating said opening from said orifice and pierced with a passage loosely traversed by said rigid element.

10. Tank according to claim 1 wherein said flow control means comprises a variable section core cooperating with a passage in a wall separating said opening from said orifice thereby providing a passage section for gas flow which can be varied according to the internal pressure of said tank.

11. Tank according to claim 2 wherein flow control means comprises a mobile flap.

12. Tank according to claim 11 wherein said flow control means comprises a cam integral with said rigid element and controlling said mobile flap.

13. Tank according to claim 12 wherein said orifice is in communication with said opening through two passages connected in parallel with different diameters, the larger passage being closable by said mobile flap.

14. Tank according to claim 2 further comprising means for blocking said rigid element in translation when, once said tank is filled, the gas flow between said orifice and said opening is interrupted by said control means.

15. Tank according to claim 1 wherein said actuating means comprises a deformable structure disposed inside and connected at several points to said casing, said deformable structure controlling the position of said flow control means.

16. Tank according to claim 15, further comprising elastic means tending to press said deformable structure against the internal wall of said casing.

17. Tank according to claim 1 wherein said actuating member comprises a rigid element outside said tank and linked at one end to the wall of said tank and on the other end to said flow control means.

18. Tank according to claim 17 wherein said actuating member forms a sliding support axis for said casing.

19. Tank according to claim 1 wherein a motion transfer hydraulic system is disposed between said actuating member and said flow control means.

20. Tank according to claim 19 wherein said hydraulic system comprises a set of two jacks having pistons of different diameters and disposed in series so that the two pistons of said hydraulic system define between them an intermediate chamber filled with a hydraulic fluid and wherein said actuating member is connected to the piston with the larger diameter, and said control means is connected to the piston with the smaller diameter.

21. Tank according to claim 20 further comprising elastic means tending to press said pistons in the direction of said actuating member.

22. Tank according to claim 1 wherein said flow control means comprises a guillotine system moved by said actuating member transversely to the relative displacement of said member with respect to said casing.

23. Tank according to claim 22 wherein one end of said actuating member has the shape of a ramp against which said guillotine system is pressed by elastic means.

24. Tank according to claim 1 wherein said flow control means comprises a rotary flap which is actuated by said actuating member and whose axis of rotation is parallel to the relative displacement direction of said actuating member with respect to said casing.

25. Tank according to claim 24 wherein the rotation of said rotary flap is controlled by said actuating member by means of a helical ramp system.

26. Tank according to claim 1 wherein said means for controlling the gas flow comprise a rotary flap actuated by said actuating member by means of a rack.

* * * * *